(12) United States Patent
Lim

(10) Patent No.: US 6,835,099 B2
(45) Date of Patent: Dec. 28, 2004

(54) ELECTRIC CELL CONNECTING APPARATUS FOR HYBRID ELECTRIC VEHICLE

(75) Inventor: Jae-Hwan Lim, Suwon (KR)

(73) Assignee: Hyundai Motor Company, Seoul (KR)

( * ) Notice: Subject to any disclaimer, the term of this patent is extended or adjusted under 35 U.S.C. 154(b) by 13 days.

(21) Appl. No.: 10/465,901

(22) Filed: Jun. 18, 2003

(65) Prior Publication Data

US 2004/0102096 A1 May 27, 2004

(30) Foreign Application Priority Data

Nov. 25, 2002 (KR) .............................. 10-2002-0073612

(51) Int. Cl.⁷ .............................................. H01R 24/00
(52) U.S. Cl. ........................................ 439/627; 429/99
(58) Field of Search .............................. 439/627, 500; 429/99; 320/107

(56) References Cited

U.S. PATENT DOCUMENTS 6,097,173 A * 8/2000 Bryant, Jr. .................. 320/107
6,287,150 B1 * 9/2001 Oda et al. .................... 439/627
6,346,011 B1 * 2/2002 Ikeda .......................... 439/627

* cited by examiner

Primary Examiner—Gary Paumen
(74) Attorney, Agent, or Firm—Morgan Lewis & Bockius LLP

(57) ABSTRACT

An electric cell connecting apparatus is provided which comprises a housing, a female connecting plate, a male connecting plate, and a terminal member. The housing is configured to receive a plurality of electric cells. The female connecting plate is provided with a plurality of holes that are formed to receive tabs of the electric cells according to a desired connection configuration of the electric cells. The male connecting plate is provided with a plurality of projections configured to be inserted into the holes of the female connecting plate, and the projections electrically connect the plurality of electric cells in a specific connection configuration. The terminal member is inserted into coupling holes that are formed in the male connecting plate, and it thereby contacts an anode and a cathode of the electric cells to output an electric voltage of the electric cells.

7 Claims, 4 Drawing Sheets

ELECTRIC CELL CONNECTING APPARATUS FOR HYBRID ELECTRIC VEHICLE

FIELD OF THE INVENTION

The present invention relates to an electric cell for a hybrid electric vehicle, and more particularly, to an apparatus for connecting electric cells of a hybrid electric vehicle.

BACKGROUND OF THE INVENTION

Generally, a hybrid electric vehicle employs a nickel metal hydride (Ni—MH) electric cell as an auxiliary power source. However, a lithium electric cell, which can be a high performance auxiliary power source, has been widely developed.

An electric cell module can be manufactured by connecting a plurality of unit electric cells (1.2V) in parallel or in series. Conventionally, electric cells are generally connected together by a cell connector, and they are coupled through bolting or welding at terminals thereof.

A terminal of a lithium electric cell of a hybrid electric vehicle is a shallow plate that is made of copper and aluminum. The terminal is bent for a connection with a coupling panel. However, the terminal can be damaged and contacting resistance between the cells may increase. Furthermore, there is a drawback that the connected portion is easily damaged so that electrolyte inside the electric cell may escape.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide an electric cell connecting apparatus that can prevent leakage of electrolyte of the electric cell, and that can increase charging convenience of the electric cell module by easily connecting the electric cells.

In a preferred embodiment of the present invention, an electric cell connecting apparatus comprises a housing, a female connecting plate, a male connecting plate, and a terminal member. The housing is configured to receive a plurality of electric cells. The female connecting plate is provided with a plurality of holes that are formed to receive tabs of the electric cells according to a desired connection configuration of the electric cells. The male connecting plate is provided with a plurality of projections configured to be inserted into the holes of the female connecting plate, and the projections electrically connect the plurality of electric cells in a specific connection configuration. The terminal member is inserted into coupling holes that are formed in the male connecting plate, thereby contacting with an anode and a cathode of the electric cells to output an electric voltage of the cells.

Preferably, the female connecting plate is made of an insulating material, and it is preferable that the holes of the female connecting plate are formed with a predetermined inclination such that the tabs of the electric cells can be inserted into the holes without being bent. It is also preferable that the holes of the female connecting plate have a trapezoidal shape.

Preferably, the projections of the male connecting plate are made of a conducting material, and it is preferable that a portion excepting the projections of the female connecting plate is made of an insulating material. It is further preferable that a cooling hole is formed in the male connecting plate for cooling the electric cells.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
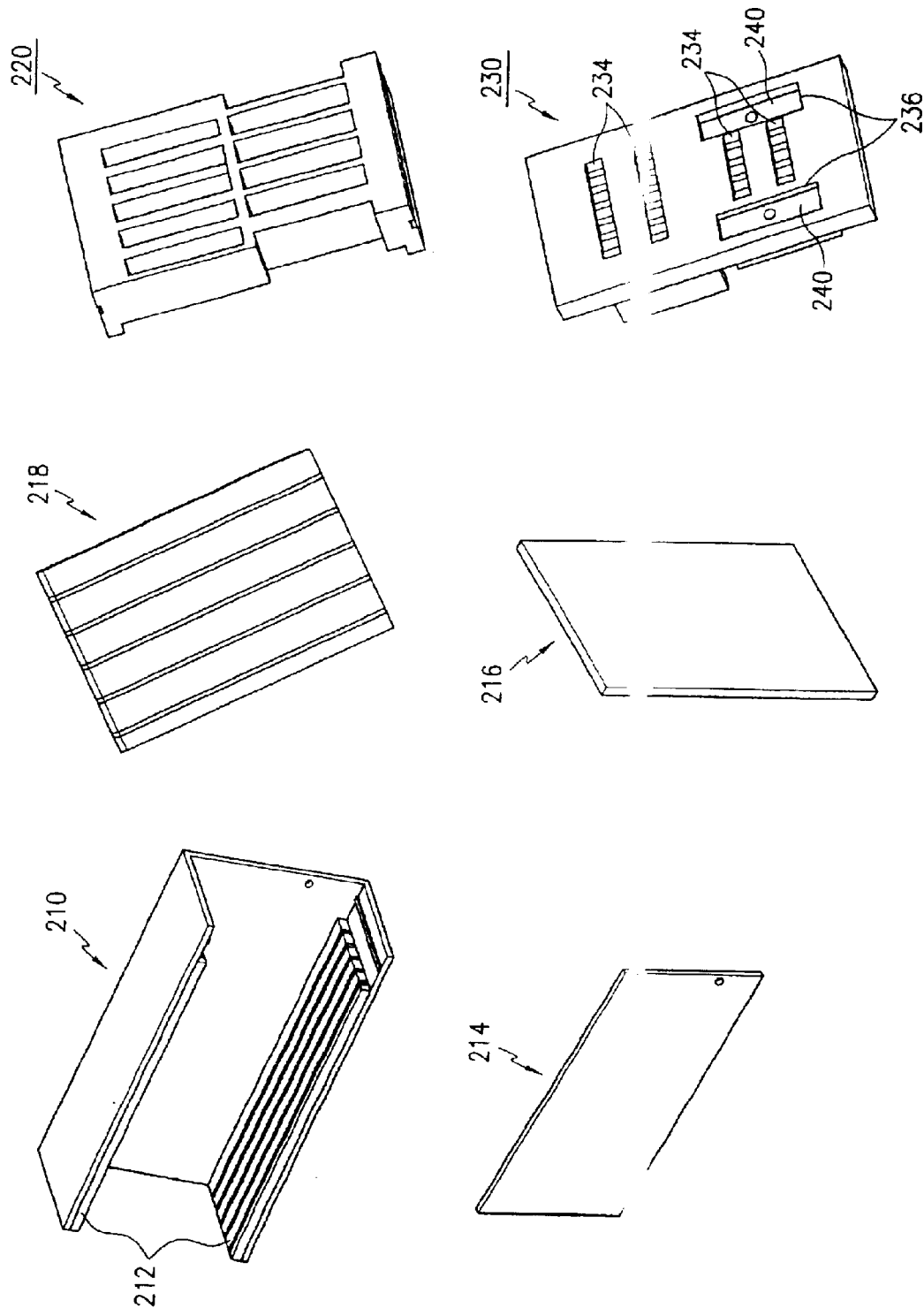
FIG. 1 is an exploded view of an electric cell connecting apparatus for hybrid electric vehicles according to a preferred embodiment of the present invention.

As shown in FIG. 1, an electric cell connecting apparatus according to a preferred embodiment of the present invention comprises a housing 210, a female connecting plate (FCP) 220, a male connecting plate (MCP) 230, and a pair of terminal members 240. The housing 210 preferably has a "⊔" shape. A side plate 214 and a rear plate 216 are respectively coupled to the housing 210. A plurality of electric cells 200 are mounted to supporters 212 of the housing 210, and the side and rear plates 214 and 216 play a role to protect the mounted electric cells.

A rear supporter 218 is mounted to the housing 210 inside the rear plate 216. The supporters 212, are mounted on two facing inside surfaces (for example, bottom and upper surfaces) of the housing 210, and electric cells 200 are inserted in grooves formed at constant intervals in the supporters 212.

As an example, in this embodiment, five grooves are formed in the supporter 212 of the housing 210, and two electric cells are inserted into each groove. Therefore, ten electric cells 200 may be mounted in one electric cell module.

The female connecting plate 220 has a plurality of holes 222 at positions corresponding to positions of tabs (aluminum and copper tabs) of the electric cells 200 according to a specific connection configuration (series connection, parallel connection, or series-parallel connection) of the electric cells 200.

The female connecting plate 220 is made of an insulating material (for example, a plastic material). The holes 222 of the female connecting plate 220 are perforated with a specific inclination such that the tab of the electric cells 200 can be inserted thereto without being bent.

Figure 2:
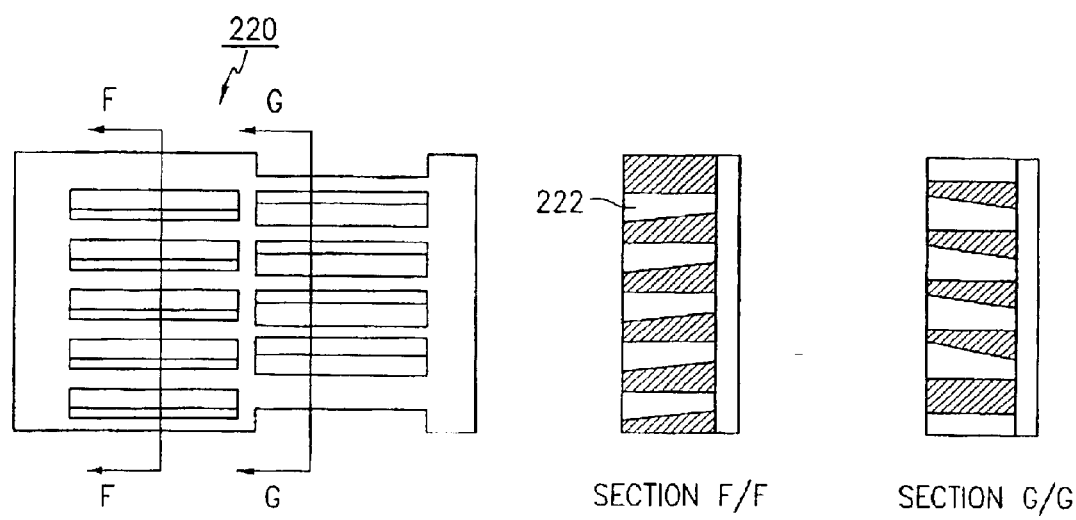
FIG. 2 shows a female connecting plate (FCP) of the electric cell connecting apparatus of FIG. 1.
Figure 3:
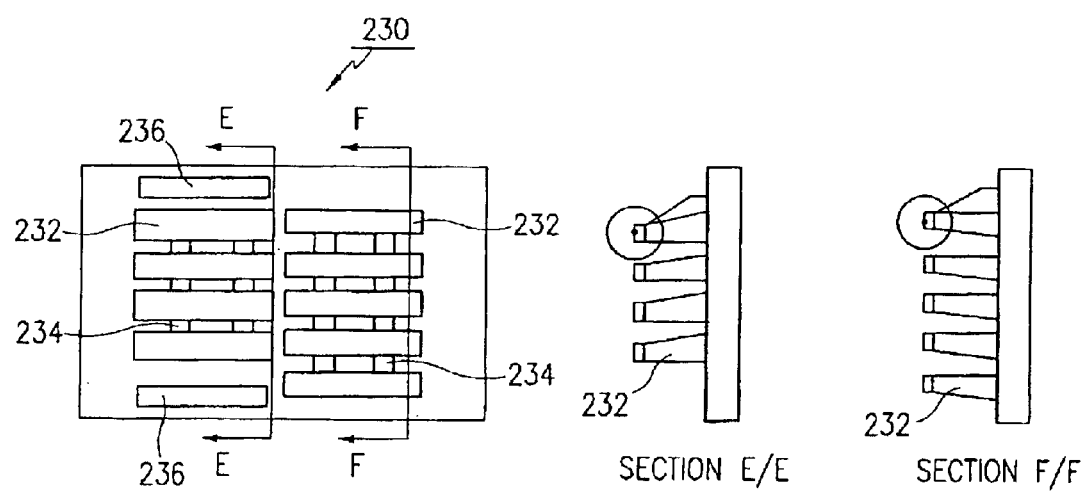
FIG. 3 shows a male connecting plate (MCP) of the electric cell connecting apparatus of FIG. 1.

Furthermore, when projections 232 of the male connecting plate 230 are inserted into the holes 222 of the female connecting plate 220, frictional resistance is generated between the surfaces of the holes 222 and projections 232 of the male connecting plate 230. In order to decrease such frictional resistance, the holes 222 are formed to have a trapezoidal shape, as shown in FIG. 2.

The male connecting plate 230 has projections 232 that are configured to be inserted into the holes 222 of the female connecting plate 220. While inserted into the holes 222 of the female connection plate 220, the projections 232 of the male connecting plate 230 contact the tab of the electric cells 200 so that the electric cells 200 can be electrically connected in a desired connection configuration.

Figure 4:
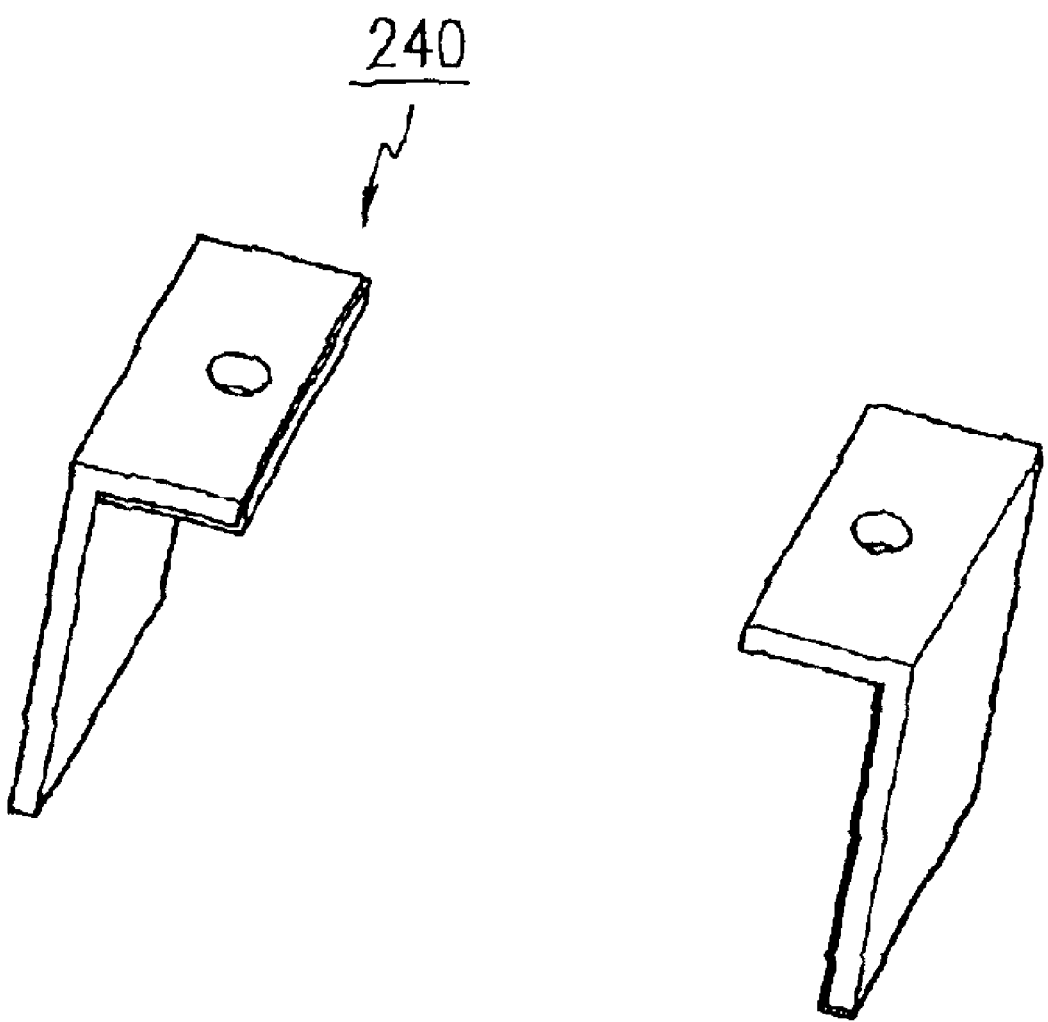
FIG. 4 is a perspective view of a terminal member of the electric cell connecting apparatus of FIG. 1.

The projections 232 of the male connecting plate 230 are made of a conducting material (for example, tinned copper), and the projections 232, as shown in FIG. 4, have a trapezoidal shape corresponding to the shape of the holes 222 of the female connecting plate 220.

A portion excepting the projections 232 of the male connecting plate 230 is made of an insulating material (for example, a plastic material).

Cooling holes 234 are formed in the male connecting plate 230 at specific positions thereof, so that airflow generated by a cooling fan can reach and cool the electric cell, thereby preventing a temperature increase in the electric cells during charging or discharging.

The terminal members 240 are inserted into coupling holes 236 formed in the male connecting plate 230, thereby contacting with the tabs (anode and cathode) of the electrical cells 200, so that the electric energy of the cell module can be output through the terminal members 240. The terminal members 240 are made of a conducting material. Also, the terminal members 240 can be used to connect one electric cell module to another.

The electric cell connecting apparatus according to the preferred embodiment of the present invention uses an arrangement of a male connector and a female connector, and therefore, it can connect the electric cells in parallel or in series without a bolt connection between the electric cells. For example, as shown in (1) of FIG. 5, the electric cells 200 are mounted in the supporter 212 of the housing 210. As shown in (2) of FIG. 5, the female connecting plate 220 is coupled to the housing 210, and the tabs of the electric cells 200 are inserted into the holes 222 of the female connecting plate 220 according to a desired connection of the electric cells 200.

Figure 5:
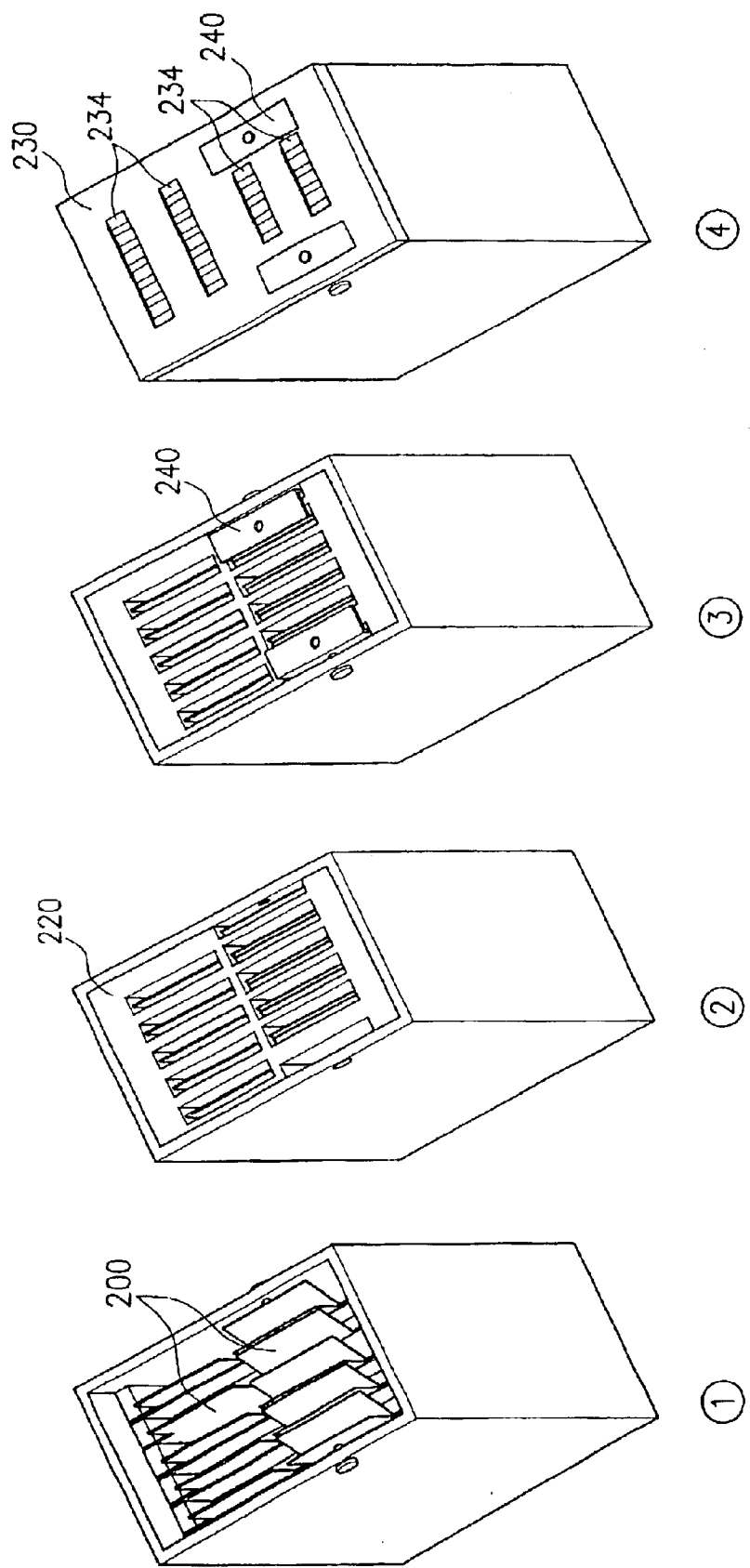
FIG. 5 shows a process of coupling the electric cells using the electric cell connecting apparatus according to the preferred embodiment of the present invention.

As shown in (3) and (4) of FIG. 5, the male connecting plate 230 and the terminal member 240 are then mounted, so that the electric cells 200 are connected with a desired connection. The male connecting plate 230 is formed such that a circuit board is mounted thereon to measure voltage.

In the electric cell connecting apparatus according to the preferred embodiment of the present invention, the aluminum tab and the copper tab need not be bent in order to connect them, so that leakage of electrolyte caused by damage to the tabs of the electric cell can be prevented. Furthermore, the electric cell module can easily be assembled or disassembled without bolting or unbolting the electric cells.

Although preferred embodiments of the present invention have been described in detail hereinabove, it should be clearly understood that many variations and/or modifications of the basic inventive concepts herein taught which may appear to those skilled in the present art will still fall within the sprit and scope of the present invention, as defined in the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. An electric cell connecting apparatus comprising:
   a housing configured to receive a plurality of electric cells;
   a female connecting plate provided with a plurality of holes that are formed to receive tabs of the electric cells according to a desired connection configuration of the electric cells;
   a male connecting plate provided with a plurality of projections configured to be inserted into the holes of the female connecting plate, the projections electrically connecting the plurality of electric cells in a specific connection configuration; and
   a terminal member inserted into coupling holes that are formed in the male connecting plate, thereby contacting an anode and a cathode of the electric cells to output an electric voltage of the electric cells.

2. The electric cell connecting apparatus of claim 1, wherein the female connecting plate is made of an insulating material.

3. The electric cell connecting apparatus of claim 1, wherein the holes of the female connecting plate are formed with a predetermined inclination such that the tabs of the electric cells can be inserted into the holes without being bent.

4. The electric cell connecting apparatus of claim 3, wherein the holes of the female connecting plate have a trapezoidal shape.

5. The electric cell connecting apparatus of claim 1, wherein the projections of the male connecting plate are made of a conducting material.

6. The electric cell connecting apparatus of claim 5, wherein a portion excepting the projections of the female connecting plate is made of an insulating material.

7. The electric cell connecting apparatus of claim 1, wherein a cooling hole is formed in the male connecting plate for cooling the electric cells.

* * * * *